US010295034B2

(12) United States Patent
Maienschein et al.

(10) Patent No.: US 10,295,034 B2
(45) Date of Patent: May 21, 2019

(54) DEVICE FOR TRANSMITTING TORQUE

(71) Applicant: Schaeffler Technologies AG & Co. KG, Herzogenaurach (DE)

(72) Inventors: Stephan Maienschein, Baden-Baden (DE); Toros Guelluek, Lichtenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 103 days.

(21) Appl. No.: 15/503,393

(22) PCT Filed: Jul. 29, 2015

(86) PCT No.: PCT/DE2015/000428
§ 371 (c)(1),
(2) Date: Feb. 11, 2017

(87) PCT Pub. No.: WO2016/023552
PCT Pub. Date: Feb. 18, 2016

(65) Prior Publication Data
US 2017/0227102 A1    Aug. 10, 2017

(30) Foreign Application Priority Data
Aug. 14, 2014  (DE) .................. 10 2014 216 198

(51) Int. Cl.
*F16H 45/02*    (2006.01)
*F16H 41/26*    (2006.01)
(Continued)

(52) U.S. Cl.
CPC ............. *F16H 45/02* (2013.01); *F16D 13/40* (2013.01); *F16H 41/26* (2013.01);
(Continued)

(58) Field of Classification Search
CPC ............... F16H 45/02; F16H 2045/007; F16H 2045/0205; F16H 2045/0221; F16H 2045/0278
See application file for complete search history.

(56) References Cited

U.S. PATENT DOCUMENTS 4,044,556 A * 8/1977 Kuramochi ............ F16H 41/26
                                                192/3.28
4,186,557 A * 2/1980 Arai ....................... F16H 41/26
                                                60/361

(Continued)

FOREIGN PATENT DOCUMENTS

CN          102072302 A       5/2011
CN          102661377 A       9/2012
(Continued)

*Primary Examiner* — David R Morris

(57) ABSTRACT

A device for transmitting torque includes a hydrodynamic torque converter having a turbine and a pump, as well as a friction clutch that is connected in parallel to the torque converter, having a first and a second frictional segment. The first frictional segment is integrated with the pump, and the second frictional segment is integrated with the turbine. A ring-shaped frictional segment, on which the frictional elements may be brought into engagement with each other axially, and a ring-shaped flow segment, on which vanes of the pump and of the turbine are located opposite each other axially, are matched with one another in their dimensions, in order to realize a balanced transmission behavior.

12 Claims, 1 Drawing Sheet

(51) Int. Cl.
 *F16D 13/40* (2006.01)
 *F16H 45/00* (2006.01)

(52) U.S. Cl.
 CPC .............. *F16H 2045/007* (2013.01); *F16H 2045/0221* (2013.01); *F16H 2045/0278* (2013.01)

(56) References Cited

U.S. PATENT DOCUMENTS

| | | | | |
|---|---|---|---|---|
| 4,783,960 A * | 11/1988 | Kubo | ............... | F16H 41/04 415/62 |
| 5,241,820 A * | 9/1993 | Fukunaga | ............... | F16H 41/26 60/330 |
| 6,464,054 B2 * | 10/2002 | Fukunaga | ............... | F16H 45/02 192/3.29 |
| 6,575,276 B2 * | 6/2003 | Fukunaga | ............... | F16H 45/02 192/212 |
| 6,959,544 B2 * | 11/2005 | Fukunaga | ............... | F16H 41/26 60/330 |
| 8,418,450 B2 * | 4/2013 | Sasse | ............... | F16H 41/26 60/330 |
| 9,803,735 B2 * | 10/2017 | Lindemann | ............... | F16H 45/02 |
| 2001/0011489 A1 * | 8/2001 | Fukunaga | ............... | F16H 45/02 74/730.1 |
| 2002/0056600 A1 * | 5/2002 | Fukunaga | ............... | F16H 45/02 192/3.29 |
| 2004/0128992 A1 | 7/2004 | Fukunaga | | |
| 2010/0083648 A1 * | 4/2010 | Sasse | ............... | F16H 41/26 60/364 |
| 2013/0230385 A1 | 9/2013 | Lindemann | | |
| 2016/0153534 A1 * | 6/2016 | Lindemann | ............... | F16H 45/02 192/3.28 |

FOREIGN PATENT DOCUMENTS

| | | |
|---|---|---|
| CN | 103206508 A | 7/2013 |
| JP | 2004205012 A | 7/2004 |

* cited by examiner

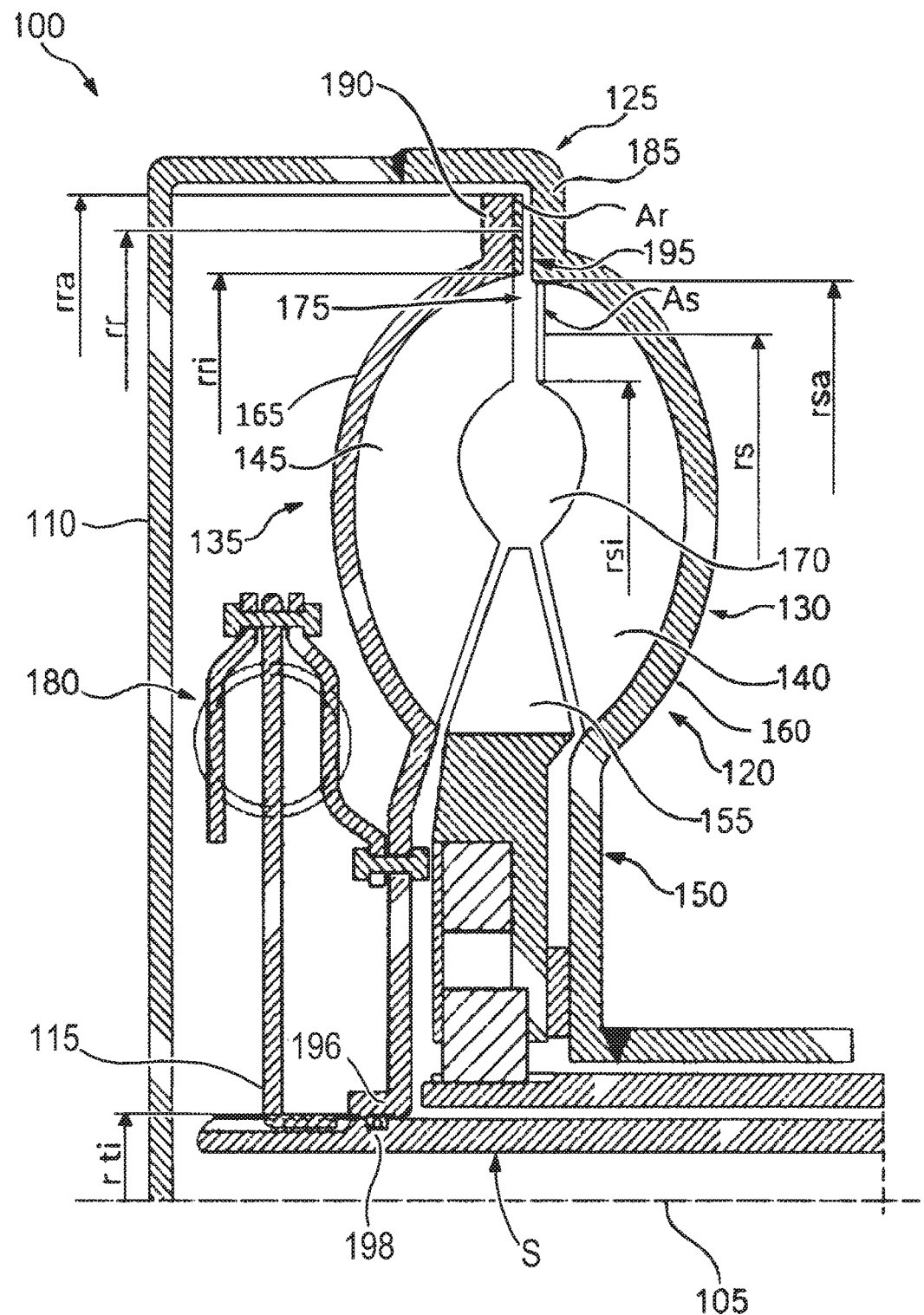

DEVICE FOR TRANSMITTING TORQUE

CROSS-REFERENCE TO RELATED APPLICATION

The present application is the U.S. national stage application pursuant to 35 U.S.C. § 371 of International Application No. PCT/DE2015/200428, filed Jul. 29, 2015, which application claims priority from German Patent Application No. DE 10 2014 216 198.3, filed Aug. 14, 2014, which applications are incorporated herein by reference in their entireties.

TECHNICAL FIELD

The invention relates to a device for transmitting torque. In particular, the invention relates to a hydrodynamic torque converter having a lockup clutch.

BACKGROUND

A device for transmitting torque includes a hydrodynamic torque converter and a friction clutch. The friction clutch is connected in parallel to the torque converter in order to bridge over the latter, for example after a driving-off process.

A known hydrodynamic torque converter having a lockup clutch is of relatively complex construction, and consequently may be relatively expensive to produce. The object of the present invention is therefore to provide an improved hydrodynamic torque converter having a lockup clutch. The invention fulfills this object by means of a device for transmitting torque having the features of the independent claim. Subordinate claims describe preferred embodiments.

SUMMARY

A device for transmitting torque includes a hydrodynamic torque converter having a turbine and a pump, and a friction clutch that is connected in parallel to the torque converter, having a first and a second frictional segment. The first frictional segment is integrated with the pump, and the second frictional segment is integrated with the turbine. A ring-shaped frictional segment, on which the first and second frictional elements may be brought into engagement with each other axially, and a ring-shaped flow segment, on which vanes of the pump and of the turbine are located opposite each other axially, are matched with one another in their dimensions.

The above configuration makes it possible to provide a simply constructed, integrated transmitting device for torque. The ring-shaped frictional segment and the flow segment may be matched with one another in such a way that transmission of torque or power is improved. An improved compromise, between a shortened connecting speed when engaging the friction clutch for a rapid, controlled torque buildup, and connecting comfort to avoid jerky engagement, is found.

It has been recognized that for improved adjustment there should be three value ratios between the ring-shaped frictional segment and the flow segment, at predefined intervals. These three value ratios are defined more precisely below.

A first value ratio q1 is determined as follows:

$$q1 = \frac{rr \cdot Ar}{rs \cdot As} \quad \text{(Equation 1)}$$

where
rr: mean radius of the ring-shaped frictional segment,
Ar: surface area of the ring-shaped frictional segment in the axial direction,
rs: mean radius of the flow segment, and
As: surface area of the flow segment in the axial direction.

Unless noted otherwise, all radii are relative to an axis of rotation of the device for transmitting torque. The mean radius rr is defined here as the arithmetic mean between the inner radius rri and the outer radius rra of the ring-shaped frictional segment. The mean radius rs is defined here as the arithmetic mean between the inside radius rsi and the outside radius rsa of the flow segment. In an example embodiment, q1 lies in a closed interval between 0.3 and 2.4. In an example embodiment, q1 lies in a closed interval of 0.5 to 2. In an example embodiment, q1 lies in the interval between 0.8 and 1.6.

A second ratio q2 is stated in Equation 2:

$$q2 = \frac{(rra^2 - rti^2) \cdot (rra + rri) \cdot 0.12}{(rsa - rsi) \cdot (rsa + rsi)^2} \quad \text{(Equation 2)}$$

where
rra: outside radius of the ring-shaped frictional segment,
rri: inside radius of the ring-shaped frictional segment,
rti: inner radius of the turbine hub,
rsa: outer radius of the flow segment, and
rsi: inner radius of the flow segment.

In an example embodiment, q2 lies in the closed interval between 0.3 and 2.0. In an example embodiment, q2 lies in the closed interval between 0.4 and 1.6. In an example embodiment, q2 lies in the closed interval between 0.5 and 1.

A third ratio is stated in Equation 3:

$$q3 = \frac{Ar}{As} \quad \text{(Equation 3)}$$

with:
Ar: surface area of the ring-shaped frictional segment in the axial direction, and
As: surface area of the flow segment in the axial direction.

In an example embodiment, q3 lies in the closed interval between 0.3 and 2.3. In an example embodiment, q3 lies in the closed interval between 0.4 and 1.6. In an example embodiment, q3 lies in the closed interval between 0.6 and 1.4.

In an example embodiment, one or more of the ratios q1, q2 and q3 lies within the assigned interval boundaries. The torque or power transmission of the device for transmitting torque can be improved thereby. Furthermore, the connecting speed of the friction clutch lies in a range that ensures an improved compromise with regard to connecting speed and avoidance of jerky engagement.

BRIEF DESCRIPTION OF THE DRAWINGS

The invention will be explained in greater detail below on the basis of figures. The figures show the following:

FIG. 1 is a partial cross-section through a device for transmitting torque.

FIG. 1 shows device 100 for transmitting torque around axis of rotation 105. By way of example, input side 110 and output side 115 of device 100 are provided. Device 100 is intended in particular for use in a drivetrain in a motor vehicle (not shown). Input side 110 may be connected in particular to a drive motor, for example an internal combustion engine, and output side 115 may be connected to a transmission. Device 100 includes hydrodynamic torque converter 120 and friction clutch 125, which are both positioned parallel to one another between input side 110 and output side 115.

Torque converter 120 includes pump 130 and turbine 135. Pump 130 includes pump vanes 140 and turbine 135 includes turbine vanes 145, which are opposite each other axially. In an example embodiment, diffuser, or stator, 150 with guide vanes 155 is provided, which is located on a predetermined radial section between pump vanes 140 and turbine vanes 145. Pump vanes 140 and turbine vanes 145 are set up to be coupled hydrodynamically by means of a fluid, in order to transmit torque. The fluid usually includes an oil. Pump vanes 140 are attached on an axial side to pump housing 160, and turbine vanes 145 are attached on an axial side to turbine housing 165. Pump housing 160 and turbine housing 165 face away from one another axially in reference to vanes 140 and 145. Between housings 160 and 165 a flow chamber is thus defined, in which the fluid flows between pump vanes 140, turbine vanes 145 and guide vanes 155.

On sides facing one another axially, pump vanes 140 and turbine vanes 145 have recesses on axial sides facing one another, which define torus-shaped chamber 170, referred to hereinafter as the inner torus, around axis of rotation 105. Guide vanes 155 are located on the radial inner side of inner torus 170. Radially outside of inner torus 170. Flow segment 175 is formed, which is located axially between sides of pump vanes 140 and turbine vanes 145 that face one another. Flow segment 175 is usually ring-shaped around axis of rotation 105, and has inner radius rsi and outer radius rsa. Mean flow radius rs of flow segment 175 is defined here as the arithmetic mean between inner radius rsi and outer radius rsa. The axial surface of a circular ring between radii rsi and rsa is called the cross section of flow segment 175 or surface of flow segment 175 in the axial direction, and is identified as.

In the depicted embodiment, vibration damper 180 is provided between turbine 135 and output side 115, in order to damp rotational non-uniformities. Damper 180 may also be designed as necessary, for example, as a series torsion damper, and/or may include an absorber and/or a centrifugal pendulum (not shown in FIG. 1).

Friction clutch 125 includes frictional segment 185 and frictional segment segment 190, which are located on different axial sides of ring-shaped frictional segment 195. Frictional segment 185 is integrated with pump 130, in particular pump housing 160, and frictional segment 190 is integrated with turbine 135, in particular with turbine housing 165. One of frictional segments 185 or 190 may include a friction element. Frictional segment 195 extends in a ring shape around axis of rotation 105, between inner radius rri and outer radius rra. Located between rri and rra is mean radius rr of frictional segment 195. A circular ring having inner radius rri and outer radius rra around axis of rotation 105 defines surface area Ar of frictional segment 195 in the axial direction.

For example, during the process of starting to drive a motor vehicle, input side 110 with pump 130 rotates at a certain speed, while output side 115 with turbine 135 is still standing still. The greater the difference in speed of rotation between pump 130 and turbine 135, the greater the torque that is transmissible via hydrodynamic torque converter 120. When the motor vehicle starts to drive off, a rotary motion of turbine 135 is accelerated and a difference in speed between pump 130 and turbine 135 decreases. The torque transmissible via torque converter 120 likewise decreases as a result, so that turbine 135 cannot reach the speed of pump 130 hydrodynamically. To adjust the speeds to one another, friction clutch 125 may be engaged. To this end, frictional segments 185 and 190 are pressed against one another axially. In the depicted embodiment, turbine 135 is placed so that the turbine is movable axially on a shaft which is connected to output side 115. If turbine 135 is pressed axially in the direction of pump 130, friction clutch 125 is engaged. A movement of turbine 135 in the opposite axial direction disengages friction clutch 125.

The axial movement, or the exertion of an axial force on turbine 135, may occur in particular hydrodynamically. In the depicted embodiment, turbine 135 is sealed at turbine hub 196 by means of shaft sealing ring 198 relative to shaft S, which is connected to output side 115. An overpressure of the fluid on one of the axial sides of turbine 135 drives turbine 135 in the corresponding axial direction. Through the use of an elastic element (not shown), turbine 135 may also be pre-tensioned in an axial direction. An increased hydraulic pressure on the respective other side of turbine 135 can counteract the spring force. In one embodiment (not shown), the hydraulic pressure is controlled specifically, in particular by means of a pump and possibly a valve. In another embodiment, the hydraulic pressure may also be built up by centrifugal forces.

Flow segment 175 and frictional segment 195 are matched to one another in such a way that predetermined value ratios result. This enables the transmission capabilities for torque of torque converter 120 and of friction clutch 125 to be adjusted to one another. In particular, a process of engaging the friction clutch 125 proceeds better.

REFERENCE LABELS 100 device
105 axis of rotation
110 input side
115 output side
120 hydrodynamic torque converter
125 friction clutch
130 pump
135 turbine
140 pump vane
145 turbine vane
150 diffuser
155 guide vane
160 pump housing
165 turbine housing
170 inner torus
175 flow segment
180 vibration damper
185 frictional segment
190 frictional segment
195 frictional segment
196 turbine hub
198 sealing ring
S shaft

The invention claimed is:
1. A hydrodynamic torque converter, comprising:
an axis of rotation;
a pump including a pump housing and at least one pump vane;
a turbine including a turbine housing and at least one turbine vane;

a friction clutch including a ring-shaped frictional segment including:
a first segment integrated with the pump housing; and,
a second segment integrated with the turbine housing;
a torus-shaped chamber formed in part by the at least one pump vane and the at least one turbine vane; and,
a flow segment located:
axially between the at least one pump vane and the at least one turbine vane; and,
radially outward of the torus-shaped chamber,
wherein:
the turbine housing is axially displaceable in an axial direction to:
engage the first and second segments;
close the friction clutch; and,
non-rotatably connect the pump housing and the turbine housing;
the ring-shaped frictional segment includes a mean radius, and a surface area in the axial direction;
the flow segment includes a mean radius, and a surface area in the axial direction;
respective values for the mean radius of the ring-shaped frictional segment, the surface area of the ring-shaped frictional segment, the mean radius of the flow segment, and the surface area of the flow segment fit within a range of values for a ratio calculated using the mean radius of the ring-shaped frictional segment, the surface area of the ring-shaped frictional segment, the mean radius of the flow segment, and the surface area of the flow segment; and,
the mean radius of the ring-shaped frictional segment and the mean radius of the flow segment are measured from the axis of rotation, wherein the ratio=(the mean radius of the ring-shaped frictional segment*the surface area of the ring-shaped frictional segment)/(the mean radius of the flow segment*the surface area of the flow segment).

2. The hydrodynamic torque converter of claim 1, wherein the ratio is at least 0.3 and is no greater than 2.4.

3. The hydrodynamic torque converter of claim 1, wherein the ratio is at least 0.5 and is no greater than 2.0.

4. The hydrodynamic torque converter of claim 1, wherein the ratio is at least 0.8 and is no greater than 1.6.

5. A hydrodynamic torque converter, comprising:
an axis of rotation;
a pump including a pump housing and at least one pump vane;
a turbine including a turbine housing and at least one turbine vane;
a friction clutch including a ring-shaped frictional segment including:
a first segment integrated with the pump housing; and,
a second segment integrated with the turbine housing;
a torus-shaped chamber formed in part by the at least one pump vane and the at least one turbine vane;
a flow segment located:
axially between the at least one pump vane and the at least one turbine vane; and,
radially outward of the torus-shaped chamber; and,
a turbine hub connected to the turbine housing and arranged to connect to a shaft,
wherein:
the turbine housing is axially displaceable in an axial direction to:
engage the first and second segments;
close the friction clutch; and,
non-rotatably connect the pump housing and the turbine housing;
the ring-shaped frictional segment includes an outside radius and an inside radius;
the flow segment includes an outer radius and an inner radius;
the turbine hub includes an inner radius;
respective values for the outside and inside radii of the ring-shaped frictional segment, the outer and inner radii for the flow segment, and the inner radius of the turbine hub fit within a range of values for a ratio of the outside and inside radii of the ring-shaped frictional segment, the outer and inner radii for the flow segment, and the inner radius of the turbine hub; and,
the outside and inside radii of the ring-shaped frictional segment, the outer and inner radii for the flow segment, and the inner radius of the turbine hub are measured from the axis of rotation; and,
the outside and inside radii of the ring-shaped frictional segment, the outer and inner radii for the flow segment, and the inner radius of the turbine hub are measured from the axis of rotation, wherein the ratio=[(the outside radius of the ring-shaped frictional segment$^2$−the inner radius of the turbine hub$^2$)*(the outside radius of the ring-shaped frictional segment+the inside radius of the ring-shaped frictional segment)*0.12]/(the outer radius of the flow segment−the inner radius of the flow segment)*(the outer radius of the flow segment+the inner radius of the flow segment)$^2$.

6. The hydrodynamic torque converter of claim 5, wherein the ratio is at least 0.3 and is no more than 2.0.

7. The hydrodynamic torque converter of claim 5, wherein the ratio is at least 0.4 and is no greater than 1.6.

8. The hydrodynamic torque converter of claim 5, wherein the ratio is at least 0.5 and is no greater than 1.0.

9. A hydrodynamic torque converter, comprising:
an axis of rotation;
a pump including a pump housing and at least one pump vane;
a turbine including a turbine housing and at least one turbine vane;
a friction clutch including a ring-shaped frictional segment including:
a first segment integrated with the pump housing; and,
a second segment integrated with the turbine housing;
a torus-shaped chamber formed in part by the at least one pump vane and the at least one turbine vane; and,
a flow segment located:
axially between the at least one pump vane and the at least one turbine vane; and,
radially outward of the torus-shaped chamber,
wherein:
the turbine housing is axially displaceable in an axial direction to:
engage the first and second segments;
close the friction clutch; and,
non-rotatably connect the pump housing and the turbine housing;
the ring-shaped frictional segment includes a surface area in the axial direction;
the flow segment includes a surface area in the axial direction; and,
respective values for the surface area of the ring-shaped frictional segment and the surface area of the flow segment fit within a range of values for a ratio calculated using the surface area of the ring-shaped frictional segment and the surface area of the flow segment, wherein the ratio=the surface area of the ring-shaped frictional segment/the surface area of the flow segment.

10. The hydrodynamic torque converter of claim 9, wherein: the ratio is at least 0.3 and is no greater than 2.3.

11. The hydrodynamic torque converter of claim 9, wherein:
the ratio is at least 0.4 and is no greater than 1.6.

12. The hydrodynamic torque converter of claim 9, wherein:
the ratio is at least 0.6 and is no greater than 1.4.

\* \* \* \* \*

UNITED STATES PATENT AND TRADEMARK OFFICE
CERTIFICATE OF CORRECTION

PATENT NO.        : 10,295,034 B2
APPLICATION NO.   : 15/503393
DATED             : May 21, 2019
INVENTOR(S)       : Maienschein et al.

Page 1 of 1

It is certified that error appears in the above-identified patent and that said Letters Patent is hereby corrected as shown below:

In the Claims

Column 6 Lines 9 through 14 should read as shown below:
--ring-shaped frictional segment, the outer and inner radii
for the flow segment, and the inner radius of the turbine
hub fit within a range of values for a ratio of the outside
and inside radii of the ring-shaped frictional segment,
the outer and inner radii for the flow segment, and the
inner radius of the turbine hub; and,--

Signed and Sealed this
Twenty-fourth Day of March, 2020

Andrei Iancu
*Director of the United States Patent and Trademark Office*